United States Patent [19]

Campbell

[11] Patent Number: 5,012,475
[45] Date of Patent: Apr. 30, 1991

[54] ANALOG COMPENSATION SYSTEM FOR LINEAR LASERS

[75] Inventor: Bruce D. Campbell, Portola Valley, Calif.

[73] Assignee: Wavelength Lasers, Inc., Sunnyvale, Calif.

[21] Appl. No.: 510,390

[22] Filed: Apr. 17, 1990

[51] Int. Cl.$^5$ .............................................. H01S 3/10
[52] U.S. Cl. ........................................ 372/29; 372/31; 455/610
[58] Field of Search ...................... 372/29, 31, 26, 38; 455/609, 610, 611

[56] References Cited

U.S. PATENT DOCUMENTS

| | | | |
|---|---|---|---|
| 3,202,928 | 8/1965 | Prior | 330/124 |
| 3,457,516 | 7/1969 | Blalock | 328/165 |
| 4,075,474 | 2/1978 | Straus et al. | 250/199 |
| 4,165,496 | 8/1979 | Di Domenico, Jr. | 372/31 |
| 4,611,352 | 9/1986 | Fujito et al. | 372/31 |
| 4,672,192 | 6/1987 | Muka et al. | 250/205 |
| 4,733,398 | 3/1988 | Shibagaki et al. | 372/31 |

OTHER PUBLICATIONS

Straus, Jozef, "Linearized Transmitters for Analog Fiber Links", *Laser Focus,* Oct. 1978, pp. 54–61.

*Primary Examiner*—James W. Davie
*Attorney, Agent, or Firm*—Townsend and Townsend

[57] ABSTRACT

An error compensation system is described which provides a linear laser signal. The error compensation system includes a first high power linear laser which is used to drive a signal onto an optical fiber. The signal on the optical fiber is tapped to provide a signal representative of the signal on the fiber. This tapped signal is compared with the original modulated signal to produce a control signal indicative of any error signal on the fiber. This control signal is inverted and used to drive a lower power laser which supplies an optical output indicative of the inverted error. By properly combining the original signal with an inverted error signal, a corrected signal may be detected from the fiber for distribution.

17 Claims, 1 Drawing Sheet

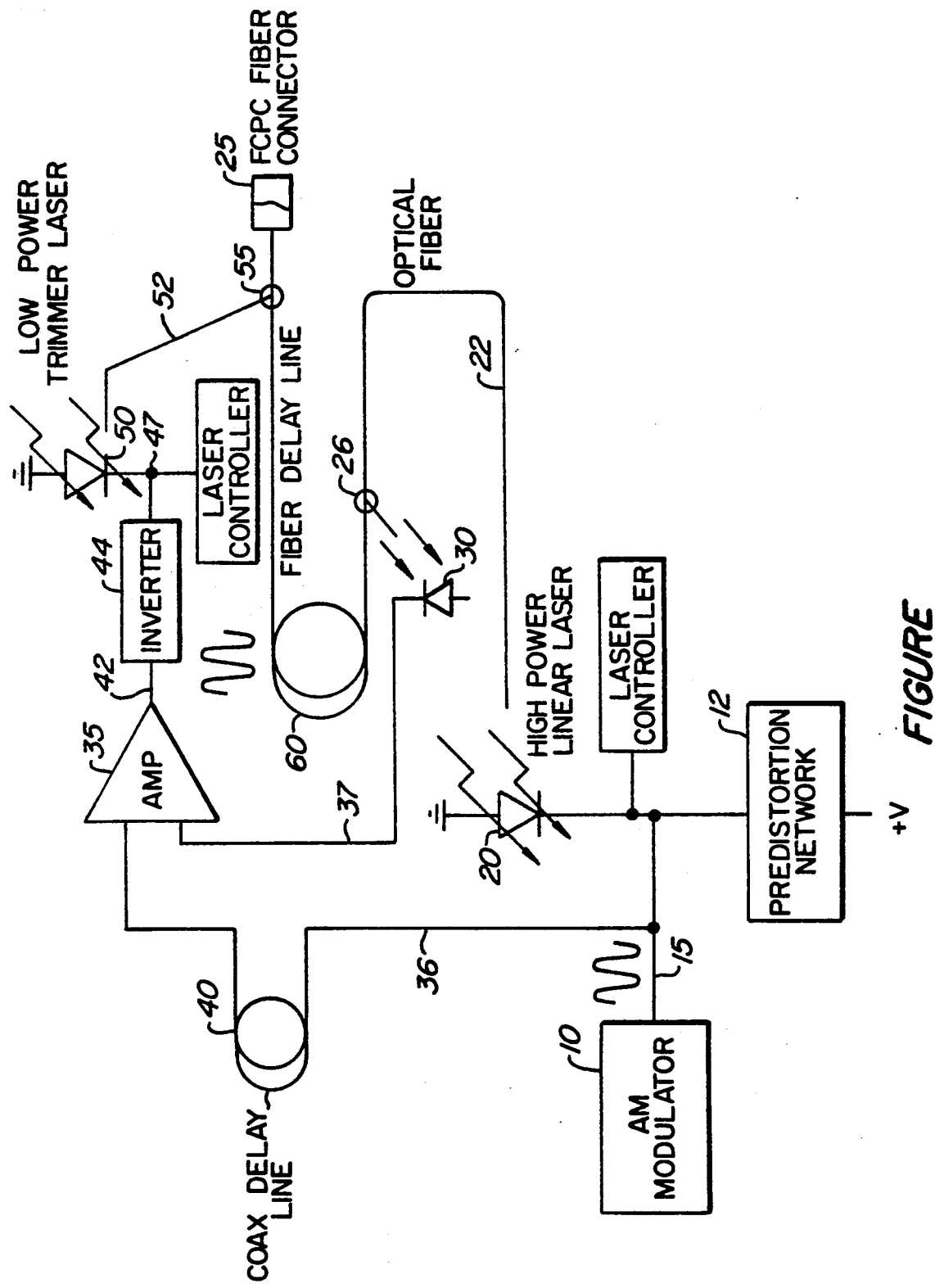

ANALOG COMPENSATION SYSTEM FOR LINEAR LASERS

BACKGROUND OF THE INVENTION

1. Field of the Invention

This invention relates to compensation circuits for lasers for correcting distortion in the output of such lasers, and in particular to an analog compensation system for a high power linear laser.

2. Description of the Relevant Art

The use of lasers for transmission of information has grown enormously in recent years. As fiber optic technology and laser technology improve, numerous applications are being found for communication over fiber optic cables providing enormous benefits with respect to conventional communication systems employing electrically conductive media. One problem with driving optical information over fiber optic cables, however, is distortion which is induced when the laser is driven at a high power. Many lasers are known to be linear over a small portion of their range; however, no lasers are linear over wide portions of their output power range. Additionally, in many applications it is desirable to acquire the least expensive laser and drive it at the highest possible power levels to obtain the maximum optical signal over the fiber optic cable. Such operations inevitably introduce distortion.

As a result, several techniques have been developed for correcting for errors and/or reducing distortion in fiber optic systems driven by lasers. For example, Muka, et al., in U.S. Pat. No. 4,672,192, describe noise reducing apparatus for a laser beam system. Muka, et al., teach a laser beam noise reduction apparatus which includes an acoustooptic cell. The cell receives a noisy input laser light beam and produces an undiffracted and a diffracted beam in response to a signal. The undiffracted beam is applied to a device which produces an information modulated output beam at a given image zone. The beam at the output of the acoustooptic cell is sampled and the information is used to reduce noise in the beam. Unfortunately, the Muka, et al., system is complicated, and requires diffraction gratings, partially silvered mirrors, and other expensive optical components.

Shibagaki, et al., in U.S. Pat. No. 4,733,398, describe a circuit for correcting for errors in a semiconductor laser. According to Shibagaki, et al., a drive circuit provides a semiconductor laser with current pulses corresponding to an input pulse signal. At the same time, a monitoring photodiode produces a light detection signal indicative of the actual laser output level. The detection signal is supplied to a subtractor to which the pulse signal is also supplied. This subtractor detects the difference between the two signals and produces an error signal. An integrator then produces an average value signal to obtain a resulting control signal. The control signal is used to modulate the signals for driving the laser to thereby maintain its output level at a constant level.

Straus, et al., in U.S. Pat. No. 4,075,474, teach an optical transmitter which utilizes two matched light emitting diodes to achieve distortion reduction. Straus, et al., achieve improved performance by modulating an electrical-to-optical converter using a modified signal. The modified signal is obtained using a matched emitting device which is used to drive an optical receiver. Errors in the received signal compared to the driving signal are then subtracted from the signal used to control the optical driver employed for the optical fiber. While the device described by Straus, et al., is suitable for some applications, it requires matched LEDs and thus is undesirable for high power applications.

Straus, et al., in "Linearized Transmitters for Analog Fiber Links," *Laser Focus*, Oct. 1978, pp. 54–61, describe an optical feedforward system in which the input signal is used to drive an amplifier for the LED. The LED output is monitored and supplied to an error control. The error control also receives the original input signal after an appropriate delay, then compares the two and uses them to drive a correcting LED.

A significant disadvantage of the approach employed by Straus, et al., is that the LEDs must be carefully matched. The entire system is predicated on the accuracy of the correcting LED matching the driving LED. An additional disadvantage is that because Straus, et al., do not tap the fiber to detect the signal on it, the errors corrected cannot match the actual signal as closely as is otherwise desired. A further disadvantage is that Straus, et al., monitors the driving LED by monitoring light which misses the fiber. As the driving signal changes, the LED output beam will widen and have a nonuniform power density. Thus, measuring the LED output outside the end of the fiber does not accurately describe the nature of the signal present within the fiber.

SUMMARY OF THE INVENTION

The compensation system of this invention provides a laser output signal which is extremely linear, even at very high power levels. It eliminates the requirement of many prior art correction circuits to have matched devices. In the case of high power lasers, the high cost of being required to provide a second duplicate laser adds substantially to the system cost.

The error compensation system for a laser according to a preferred embodiment of this invention includes a first laser of typically high power. A modulator is coupled to the first laser for providing a signal to drive the first laser to cause it to emit light, typically in accordance with a cable television, telephone or other modulation signal. The laser supplies light into an optical fiber which is tapped to remove a desired preferably small quantity of light from the fiber. An optical sensor, typically a photodiode, is positioned in proximity to the tap to detect the light tapped from the fiber. The output from the optical sensor is supplied to an amplifier. Another input to the amplifier is the original modulation signal used to drive the first laser. The amplifier compares the two signals and supplies an error correction signal to modulate a second laser operating at a slightly different wavelength from that of the first laser. As a result, the second laser provides an output beam which has as its modulation the inverse of the harmonics or other errors introduced by the first laser. The second laser is coupled to the same fiber and eventually to the same receiving sensor as the first laser. By adjusting the length of the fiber between the first laser and the coupler for the second laser, the timing of the second laser output signal can coincide with the first laser output signal, thereby providing a signal at the optical sensor output at the end of the fiber which is free of distortion introduced by driving the first laser with the high modulation power.

BRIEF DESCRIPTION OF THE DRAWINGS

The figure is a schematic diagram of the error compensation system of a preferred embodiment of this invention.

DETAILED DESCRIPTION OF THE PREFERRED EMBODIMENTS

The figure is a schematic drawing which illustrates a preferred embodiment of the invention. As shown in the figure, the error compensation system includes an amplitude modulator 10 which provides an output signal on line 15 for driving a high power linear laser 20. The function of the system depicted in FIG. 1 is to ultimately supply from a receiver connected to the fiber, for example at the FCPC fiber connector 25, a signal which is as purely linear with respect to the incoming R.F. signal 15 as possible.

Applications for such a system are plentiful. For example, the system such as depicted in the figure may be readily employed in telephone systems, in which case the modulator 10 will drive the fiber with a series of signals related to voice information for telephone calls occurring. In other embodiments of the invention, the amplitude modulator 10 will provide output signals for data transmission, video signal transmission, or combinations of the above, for example, as in a cable television system. In a cable television system the AM modulator will place on the optical fiber a signal indicative of the audio and video contents of a desired television channel or channels.

In a typical application, the high power linear laser 20 consists of a distributed feedback linear laser with a few milliwatt power level. Such lasers are commercially available from American Telephone & Telegraph, Mitsubishi, and other companies. AM modulators such as described are also commercially available, and the particular implementation will depend upon the application for the system shown in the figure.

In some embodiments a predistortion network 12 is employed. Network 12 predistorts the input signal to the laser 20 to compensate for nonlinearities in the laser output. One such predistortion circuit is described in commonly assigned U.S. Pat. application Ser. No. 07/512,296, entitled "Compensating Circuit for High Power Lasers," filed on the same date as this application and incorporated herein by reference.

The light emitted by the high power linear laser 20 in response to the output of modulator 15 is placed onto the optical fiber 22 and is transmitted to a tap 26 where a small portion of the light is removed from the fiber. Taps such as tap 26 are commercially available, and in the preferred embodiment comprise a fused biconic-type tap or a bend type coupler. Light from the tap is detected by a photodetector 30, preferably a commercially available device having approximately 1 nanosecond rise time and a transimpedance amplifier.

The receiver 30 for the tap 26 is coupled to a summing amplifier 35, one implementation being a cascade of amplifier modules such as model PPA 441, which can be purchased from Avantek, Inc. Receiver 30 provides one input to the amplifier. The other input signal to the amplifier consists of the signal on line 36, originating from the amplitude modulator 10. Importantly, the signal on line 36 corresponds to the signal used to drive the linear laser 20. An adjustable delay 40 is employed on line 36 to delay transmission of the signal to summing amplifier 35 for an appropriate time period. The length of the time period of coaxial delay line 40 is set to match the delay inherent in the driving of the high power linear laser, the optical fiber transmission path to tap 26, delays inherent in the photodetector 30, and transmission of that signal to amplifier 35. As a result, when properly adjusted, the coaxial delay line causes the original amplitude modulation signal on line 15 to arrive at the amplifier 35 in phase with the signal from the photodetector 30, but with opposite polarity.

When the high power linear laser is driven with relatively high power, and even with considerably less power than maximum, harmonics and other errors are generated by the laser. Thus, the optical signal on line 22 will represent the original amplitude modulation signal from modulator 10 as well as the harmonics and other spurious signals resulting from the driving of the laser 20 at a high power. Summing amplifier 35 will receive two signals, one on line 36 representative of the original amplitude modulation signal without harmonics, and one on line 37 representative of the high power signal plus harmonics. Summing amplifier 35 compares these two signals and produces an output signal which is representative of only the harmonics and other errors. This signal appears on line 42 and is inverted by inverter 44 before being supplied to a lower power trimmer laser 50. The signal on line 47, representative of the inverted driving signal, is supplied to modulate the trimmer laser 50. Preferably, the low power trimmer laser 50 comprises a Fabry Perot device. The low power trimmer laser function can be provided by lower cost devices such as a gain guided laser or a quantum well laser. In response the trimmer laser 50 places on optical fiber 52 an optical signal representative of the inverse of the harmonics or other errors. Through another tap 55 on optical fiber 22, used as a summing means, the original optical signal from the high power linear laser 20 having modulation containing both the optical information and harmonics, is combined with the optical signal on fiber 52 which has been modulated by the inverted harmonics. To enable proper timing of both signals so that they arrive in phase and inverted harmonic signal cancels the harmonic signal, an optical fiber delay line 60 is employed. The fiber delay line is adjusted to make the phases of the modulation signals on line 22 and 52 coincide. The result is two optical signals at fiber connector 25, one modulated by the desired signal plus undesired distortions, and the other modulated by the inverse of the distortions. At the end of the fiber, a common detector recovers the modulation from both optical signals, producing an output representative only of the desired modulation signal, with the harmonics and other errors cancelled out. In this manner a highly linear output signal, essentially free of harmonic distortion, is supplied by the system.

A critical part of the system is the accuracy with which amplifier 35 and trimmer laser 50 reproduce only those harmonics and distortions which were present in the output of the high power laser. Since the comparison process in amplifier 35 cannot be perfect, the signal 47 contains a small amount of the original modulation signal 15. While this residual signal is small, it may be substantially larger than the harmonics and distortion components from the high power laser that are passing through amplifier 35. Thus, the linear dynamic range of the combination of amplifier 35, inverter 44, and trimmer laser 50 must be great enough that distortion generated within these components, from the combination of the residual modulation signal and the signal that is the distortions from the high power laser, is well below those distortions from the high power laser.

Another important aspect of the system is the need to keep the trimmer wavelength at a fixed separation from the high power primary laser. This is usually accomplished through temperature stabilization of the lasers. Single mode fiber has a dispersion of typically 2 ps/nm.km. Therefore, if the two LDs are separated by 0.2 nm and the link length is 10 km, then the dispersion between the LDs is 4 ps, which will not be a problem. On the other hand, if the LDs are separated by 2 nm and the link length is 20 km, then the dispersion amounts to 80 ps and the feed forward signal will not correct adequately across the entire band. It is important to keep the LDs separated by at least 0.2 nm in order to prevent "beating" between the two LDs. This separation requirement stems primarily from temperature control errors since:

$$\frac{\Delta\lambda}{\Delta T} \sim 0.2 \ nm/^\circ C.$$

Although the foregoing has been a description of the preferred embodiment of the invention, it will be apparent that various modifications or substitutions may be affected without departing from the spirit of the invention, which is set forth in the appended claims.

I claim:

1. An error compensation system comprising:
   a first laser;
   modulation means coupled to the first laser for providing an output signal to drive the first laser to cause it to emit modulated light;
   an optical fiber disposed to receive light from the first laser;
   tap means coupled to the optical fiber for removing a desired amount of light from the optical fiber;
   sensing means disposed in proximity to the tap for detecting the light removed from the optical fiber and in response providing a first signal;
   comparator means connected to the sensing means to receive the first signal and connected to the modulation means to receive the output signal, and in response thereto provide an error correction signal;
   a second laser connected to receive the error correction signal and in response emit modulated light; and
   summing means connected to receive the light from the second laser and combine it with light from the first laser on the optical fiber; and
   detector means coupled to the summing means to receive the combined light from the first and second laser and to generate an output signal with the desired modulation without the distortions.

2. A system as in claim 1 further comprising a first delay line connected to the comparator means and connected to the modulation means for receiving the output signal therefrom and delaying the output signal before supplying it to the comparator means.

3. A system as in claim 2 further comprising a second delay line connected between the tap means and the summing means for delaying the light therebetween.

4. A system as in claim 3 wherein:
   the output signal is an electronic signal; and
   the first delay line comprises a elongated electrical conductor.

5. A system as in claim 4 wherein the second delay line comprises an elongated optical fiber.

6. A system as in claim 1 wherein the comparator means comprises:
   amplifier means for comparing the first signal and the output signal and in response providing a difference signal indicative of the difference between the first signal and the output signal; and
   inverting means connected to the amplifier means for inverting the difference signal and providing a resulting inverted difference signal to the second laser.

7. A system as in claim 1 wherein the tap means comprises a tap for the optical fiber which tap removes a lesser portion of the light therein without affecting a greater portion remaining.

8. A system as in claim 7 wherein the tap means comprises a fused biconic tap.

9. A system as in claim 7 wherein the tap means comprises a bend type coupler.

10. A system as in claim 1 wherein:
    the first laser comprises a high power laser; and
    the second laser comprises a low power laser.

11. A system as in claim 10 wherein:
    the high power laser comprises a distributed feedback linear laser; and
    the low power laser comprises a Fabry Perot laser.

12. A system as in claim 1 wherein the modulation means comprises an amplitude modulator.

13. A system as in claim 12 wherein the amplitude modulator comprises a modulator for one or more television channels.

14. A system as in claim 1 wherein the sensing means comprises a photodetector.

15. A system as in claim 1 further comprising means for predistorting the output signal from the modulation means.

16. An error compensation system for one or more television signals being transmitted over an optical fiber comprising:
    a first high power laser;
    an amplitude modulator coupled to the first laser for providing a television signal to drive the first laser to cause it to emit modulated light;
    an elongated electrical conductor delay line connected to the amplitude modulator for receiving the television signal therefrom and delaying it;
    an optical fiber disposed to receive light from the first laser;
    a tap coupled to the optical fiber spaced apart from the first laser along the optical fiber for removing a desired amount of light from the optical fiber;
    a photodetector disposed in proximity to the tap for detecting the light removed from the optical fiber and in response providing a first signal;
    a summing amplifier connected to the photodetector to receive the first signal and connected to the electrical conductor to receive the television signal for comparing the first signal and the television signal and in response providing a difference signal indicative of the difference between the first signal and the television signal;
    a second low power laser connected to receive the difference signal and in response emit light;
    an elongated optical fiber delay line connected to the tap for delaying the light not removed from the optical fiber; and a second tap connected to fiber delay line to receive the light from the second laser and combine it with light from the first laser on the optical fiber; and detector means coupled to the summing means to receive the combined light from the first and second laser and to generate an output signal with the desired modulation without the distortions.

17. A system as in claim 16 wherein:
the high power laser comprises a distributed feedback linear laser; and
the low power laser comprises a Fabry Perot laser.

* * * * *